United States Patent
Koeda et al.

(10) Patent No.: US 9,869,307 B2
(45) Date of Patent: Jan. 16, 2018

(54) COMPRESSOR HAVING OIL SEPARATOR

(71) Applicant: KABUSHIKI KAISHA TOYOTA JIDOSHOKKI, Aichi-ken (JP)

(72) Inventors: Naoki Koeda, Kariya (JP); Ai Saeki, Kariya (JP); Kazuhiro Kuroki, Kariya (JP); Ryo Matsubara, Kariya (JP); Tetsuhiko Fukanuma, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 238 days.

(21) Appl. No.: 14/739,361

(22) Filed: Jun. 15, 2015

(65) Prior Publication Data

US 2015/0369233 A1 Dec. 24, 2015

(30) Foreign Application Priority Data

Jun. 18, 2014 (JP) ................................ 2014-125303
Mar. 25, 2015 (JP) ................................ 2015-063158

(51) Int. Cl.
*F04B 39/16* (2006.01)
*F04B 53/16* (2006.01)
(Continued)

(52) U.S. Cl.
CPC ............. *F04B 39/16* (2013.01); *F01M 13/00* (2013.01); *F04B 27/109* (2013.01);
(Continued)

(58) Field of Classification Search
CPC .......... F04B 39/02; F04B 39/16; F04B 53/18; F04B 39/0284; F04B 39/0207; F04B 27/1081; F04B 27/1036; F04B 27/109; F04B 53/16; F04B 27/04; F01M 13/00; F16N 31/00

See application file for complete search history.

(56) References Cited

U.S. PATENT DOCUMENTS 6,179,578 B1   1/2001 Kayukawa et al.
2004/0179952 A1  9/2004 Iizuka
(Continued)

FOREIGN PATENT DOCUMENTS

EP   0965804   12/1999
EP   1798499   6/2007
(Continued)

OTHER PUBLICATIONS

Office Action in Japanese counterpart application No. 2015-063158, dated Jun. 6, 2017.
(Continued)

*Primary Examiner* — Bryan Lettman
(74) *Attorney, Agent, or Firm* — Greenblum & Bernstein, P.L.C.

(57) ABSTRACT

An oil separation member has a partition member that partitions between a discharge chamber and a discharge passage. A circular ring portion is provided in the partition member in a manner extending toward the discharge passage. An introduction hole that communicates the discharge chamber and the discharge passage with each other is formed in the circular ring portion. The introduction hole extends in a tangential direction to the circular ring portion.

7 Claims, 7 Drawing Sheets

(51) Int. Cl.
  *F04B 53/18* (2006.01)
  *F16N 31/00* (2006.01)
  *F01M 13/00* (2006.01)
  *F04B 27/10* (2006.01)
  *F04B 39/02* (2006.01)
  *F04B 27/04* (2006.01)

(52) U.S. Cl.
  CPC ...... *F04B 27/1036* (2013.01); *F04B 27/1081* (2013.01); *F04B 39/02* (2013.01); *F04B 39/0207* (2013.01); *F04B 39/0284* (2013.01); *F04B 53/16* (2013.01); *F04B 53/18* (2013.01); *F16N 31/00* (2013.01); *F04B 27/04* (2013.01)

(56) References Cited

U.S. PATENT DOCUMENTS

2007/0140870 A1* 6/2007 Fukanuma ............ F04B 27/109
                                                          417/269
2009/0246060 A1   10/2009 Inoue et al.
2010/0018386 A1*  1/2010 Inoue .................... F04B 27/109
                                                           92/78

FOREIGN PATENT DOCUMENTS

| | | |
|---|---|---|
| EP | 2000672 | 12/2008 |
| EP | 2025936 | 2/2009 |
| JP | 2003-176779 | 6/2003 |
| JP | 2004-293543 | 10/2004 |
| JP | 2004-332637 | 11/2004 |
| JP | 2009-221960 | 10/2009 |
| JP | 2013-185531 | 9/2013 |
| JP | 2014-202160 | 10/2014 |

OTHER PUBLICATIONS

Extended European Search Report for EP 15171580.2 dated Dec. 21, 2015.

* cited by examiner

COMPRESSOR HAVING OIL SEPARATOR

BACKGROUND OF THE INVENTION

The present invention relates to a compressor.

A refrigerant circulation circuit of an air conditioner includes a compressor and an external refrigerant circuit. The external refrigerant circuit includes a condenser that condenses a compressed refrigerant discharged from the compressor, an expansion valve that is connected to the condenser, and an evaporator that evaporates an expanded refrigerant passed through the expansion valve.

The refrigerant contains oil to be used for lubrication of respective sliding parts inside of the compressor. When the oil is discharged from the compressor to the external refrigerant circuit together with the refrigerant, the oil adheres to an inner wall of the condenser and evaporator to degrade the heat exchange efficiency of the condenser and evaporator. Japanese Laid-Open Patent Publication No. 2004-332637 discloses a structure for separating oil contained in the refrigerant from the refrigerant in order to suppress the oil from being discharged from a compressor to an external refrigerant circuit together with the refrigerant.

Figure 7:
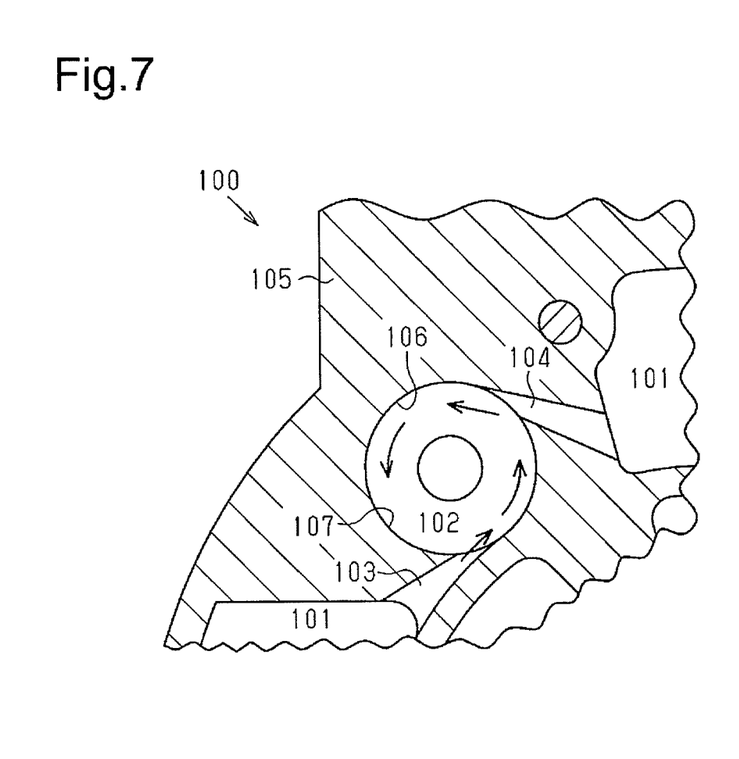
FIG. 7 is a sectional view showing a part of a conventional compressor in an enlarged manner.

As shown in FIG. 7, the oil separation structure disclosed in Japanese Laid-Open Patent Publication No. 2004-332637 includes introduction passages 103 and 104 that communicate a discharge chamber 101 and a separation chamber 102 with each other. Refrigerant discharged to the discharge chamber 101 is introduced into the separation chamber 102 via the introduction passages 103 and 104. A separation chamber forming hole 106 that forms the separation chamber 102 is formed in a rear housing 105. The separation chamber forming hole 106 has a cylindrical inner surface 107. The separation chamber forming hole 106 has an axis parallel to a rotary shaft of the compressor 100. The refrigerant, when introduced into the separation chamber 102 via the introduction passages 103 and 104 from the discharge chamber 101, circles along the cylindrical inner surface 107. The refrigerant and oil are thus subjected to centrifugation.

However, in the oil separation structure disclosed in Japanese Laid-Open Patent Publication No. 2004-332637, the introduction passages 103 and 104 that communicate the discharge chamber 101 and the separation chamber 102 with each other need to be formed in the rear housing 105. Therefore, the rear housing member 15 is limited in the degree of freedom of design.

SUMMARY OF THE INVENTION

It is an object of the present invention to provide a compressor whereby the ability to separate oil from a refrigerant is improved, without being limited in the degree of the freedom of design.

In order to solve the above-described problems, according to a first aspect of the present invention, a compressor includes: a discharge chamber that is formed in a housing; an oil separation member that is a separate member from the housing and separates oil from refrigerant discharged from the discharge chamber; a discharge passage that is formed in the housing and discharges refrigerant from which oil has been separated by the oil separation member to an external refrigerant circuit; and an oil passage that is formed in the housing and introduces oil separated by the oil separation member into an oil reservoir chamber. The oil separation member has a partition member that partitions between the discharge chamber and the discharge passage. A circular ring portion is provided in a manner extending toward the discharge passage in the partition member. An introduction hole that communicates the discharge chamber and the discharge passage with each other is formed in the circular ring portion. The introduction hole extends in a tangential direction to the circular ring portion.

DETAILED DESCRIPTION OF THE PREFERRED EMBODIMENTS

Hereinafter, an embodiment of a compressor of the present invention embodied into a variable displacement swash type compressor will be described according to FIG. 1 to FIG. 3. The swash plate type compressor is used for a vehicle air conditioner.

Figure 1:
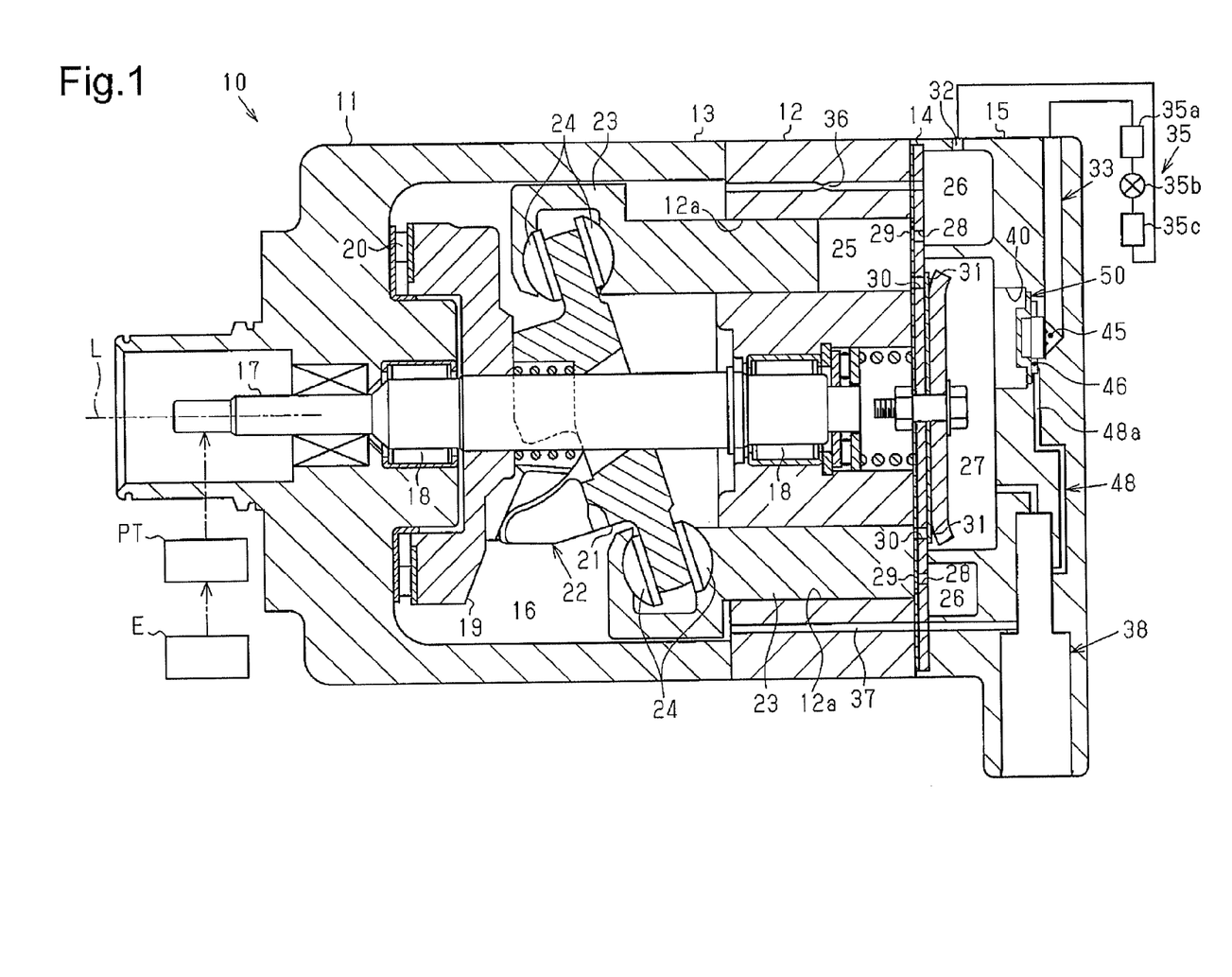
FIG. 1 is a side sectional view showing a swash plate type compressor according to an embodiment of the present invention.

As shown in FIG. 1, the swash plate type compressor 10 has a housing 11. The housing 11 is composed of a cylinder block 12, a front housing member 13 that is coupled to a front end of the cylinder block 12, and a rear housing member 15 that is coupled to a rear end of the cylinder block 12 via a valve/port plate 14. A crank chamber 16 is formed in a space surrounded by the front housing member 13 and the cylinder block 12 within the housing 11. A rotary shaft 17 is rotatably supported via radial bearings 18 in the cylinder block 12 and the front housing member 13. The rotary shaft 17 penetrates through the crank chamber 16.

An engine E that is a traveling drive source of a vehicle is coupled to the rotary shaft 17 via a clutchless type (constant transmission type) power transmission mechanism PT. Thus, during operation of the engine E, the rotary shaft 17 is rotated at all times by power supplied from the engine E.

A rotation support 19 and a swash plate 21 are arranged together with the rotary shaft 17 in the crank chamber 16. The rotation support 19 is fixed to the rotary shaft 17, and is rotatable together with the rotary shaft 17. The rotation support 19 is supported on the front housing member 13 via a thrust bearing 20. The swash plate 21 is able to tilt and is supported, with respect to the rotary shaft 17, in a manner that permits the swash plate 21 to slide along a rotation axis L. A hinge mechanism 22 is located between the rotation support 19 and the swash plate 21. The swash plate 21 is constructed to be tiltable with respect to the rotation axis L of the rotary shaft 17 and rotatable together with the rotary shaft 17 by a hinge mechanism 22.

A plurality of cylinder bores 12a are arranged around the rotary shaft 17 in the cylinder block 12. Also, each of the plurality of cylinder bores 12a accommodates a single-headed piston 23, while permitting the single-headed piston 23 to reciprocate. The piston 23 is engaged on an outer peripheral portion of the swash plate 21 via a pair of shoes 24. The piston 23 reciprocates within the cylinder bore 12a due to a rotational motion of the swash plate 21. A compression chamber 25 is formed within the cylinder bore 12a. The compression chamber 25 has a volume that changes according to reciprocation of the piston 23.

A ring-shaped suction chamber 26 is formed between the valve/port plate 14 and the rear housing member 15 within the housing 11. A discharge chamber 27 is formed inside of the suction chamber 26. A suction port 28 and a suction valve 29 and a discharge port 30 and a discharge valve 31 are formed in the valve/port plate 14. The suction port 28 and the suction valve 29 are arranged between the compression chamber 25 and the suction chamber 26. The discharge port 30 and the discharge valve 31 are arranged between the compression chamber 25 and the discharge chamber 27.

A suction passage 32 that communicates with the suction chamber 26 is formed in the rear housing member 15. An accommodation chamber 40 contained in the discharge chamber 27 is formed in the rear housing member 15. The accommodation chamber 40 accommodates a disk-shaped oil separation member 50 to separate oil contained in a refrigerant such as carbon dioxide. Further, a discharge passage 33 is formed in the rear housing member 15 to discharge the refrigerant from which oil has been separated by the oil separation member 50 to an external refrigerant circuit 35. A refrigerant discharge space 45 included in the discharge passage 33 is formed in the rear housing member 15. The refrigerant from which oil has been separated by the oil separation member 50 is discharged to the refrigerant discharge space 45 from the oil separation member 50. Also, an oil passage 48 is formed in the rear housing member 15 to introduce oil separated from the refrigerant by the oil separation member 50 into the crank chamber 16. An oil reservoir space 46 contained in the oil passage 48 is formed in the rear housing member 15. The oil separated from the refrigerant by the oil separation member 50 is reserved in the oil reservoir space 46.

The suction passage 32 and the discharge passage 33 are connected by the external refrigerant circuit 35. The external refrigerant circuit 35 includes a condenser 35a connected to the discharge passage 33, an expansion valve 35b connected to the condenser 35a, and an evaporator 35c connected to the expansion valve 35b. The evaporator 35c is connected with the suction passage 32. The swash plate type compressor 10 is incorporated in a refrigeration circuit.

Refrigerant introduced into the suction chamber 26 from an outlet of the evaporator 35c is, by a movement of each piston 23 from a top dead center to a bottom dead center, drawn into the compression chamber 25 via the suction port 28 and the suction valve 29. The refrigerant drawn into the compression chamber 25 is, by a movement of the piston 23 from the bottom dead center to the top dead center, compressed to a predetermined pressure, and is discharged to the discharge chamber 27 via the discharge port 30 and the discharge valve 31.

A bleed passage 36 that connects the suction chamber 26 and the crank chamber 16 is formed in the cylinder block 12 and the rear housing member 15. Also, a supply passage 37 that connects the discharge chamber 27 and the crank chamber 16 is formed in the cylinder block 12 and the rear housing member 15. A displacement control valve 38 is arranged in the supply passage 37. The displacement control valve 38 consists of a solenoid valve and opens and closes the supply passage 37 by magnetization and demagnetization of its solenoid.

By the displacement control valve 38 opening and closing the supply passage 37, the amount of supply of a high-pressure refrigerant from the discharge chamber 27 to the crank chamber 16 is changed. Also, the crank chamber 16 is changed in pressure based on a relationship between the amount of discharge of the refrigerant from the crank chamber 16 to the suction chamber 26 via the bleed passage 36. As a result, a pressure difference between the crank chamber 16 and the cylinder bore 12a is changed, so that the swash plate 21 is changed in inclination angle, and the swash plate type compressor 10 is adjusted in displacement.

Specifically, magnetization/demagnetization of the solenoid of the displacement control valve 38 is controlled by a control computer (not shown). Electric signaling connection is provided between the control computer and an air conditioner switch. When the air conditioner switch is turned off, the control computer demagnetizes the solenoid of the displacement control valve 38. Then, the supply passage 37 is opened by the displacement control valve 38 to communicate the discharge chamber 27 and the crank chamber 16 with each other. Thus, a high-pressure refrigerant in the discharge chamber 27 is supplied to the crank chamber 16 via the supply passage 37. Further, the pressure of the crank chamber 16 is bled off to the suction chamber 26 via the bleed passage 36. As a result, the difference in pressure between the crank chamber 16 and the cylinder bore 12a is changed, so that the inclination angle of the swash plate 21 is minimized, and the displacement is minimized.

On the other hand, when the air conditioner switch is turned on, the control computer magnetizes the solenoid of the displacement control valve 38. Then, the supply passage 37 is reduced in opening degree by the displacement control valve 38, and the pressure of the crank chamber 16 lowers based on a pressure release of the suction chamber 26 by the bleed passage 36. By the decrease in pressure in the crank chamber 16, the inclination angle of the swash plate 21 is increased from the minimum inclination angle. The swash plate type compressor 10 then performs compression with a displacement exceeding the minimum displacement.

Figure 2:
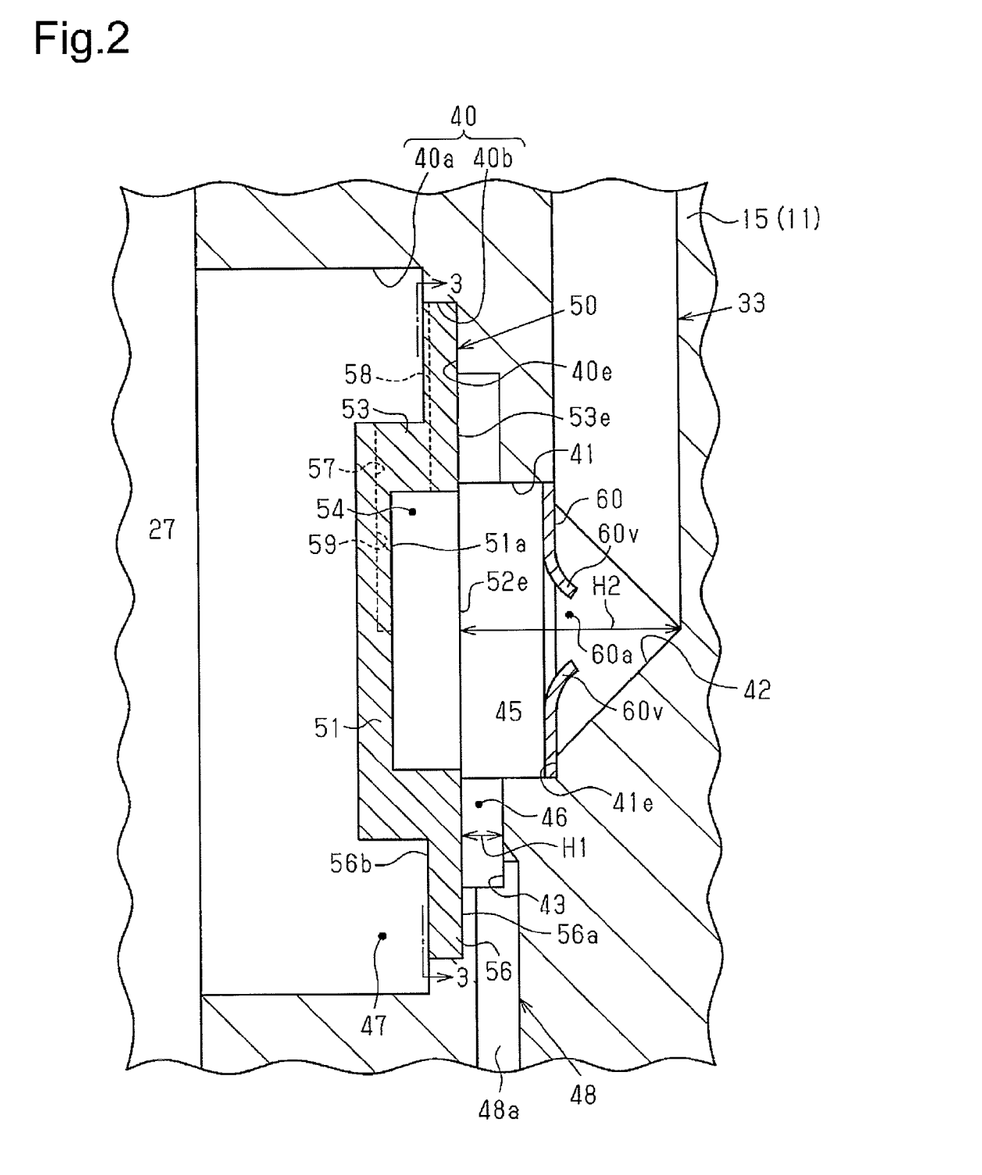
FIG. 2 is a side sectional view showing a part of the swash plate type compressor in an enlarged manner.

As shown in FIG. 2, the accommodation chamber 40 consists of a wide-width portion 40a and a narrow-width portion 40b. The narrow-width portion 40b is continuous from the wide-width portion 40a, and has a width narrower than that of the wide-width portion 40a. A first recess portion 41 is formed in a bottom surface 40e of the narrow-width portion 40b. A second recess portion 42 is formed in a bottom surface 41e of the first recess portion 41. The first recess portion 41 and the second recess portion 42 form the refrigerant discharge space 45. A ring-shaped groove portion 43 is also formed in the bottom surface 40e of the narrow-width portion 40b. The ring-shaped groove portion 43 is formed on an inner peripheral surface near the narrow-width portion 40b in the first recess portion 41.

The oil separation member 50 is a separate member from the rear housing member 15 and is formed in a perfect circle shape in a plan view. The oil separation member 50 has a partition member 51 to partition between the accommodation chamber 40 and the discharge passage 33, that is, between the discharge chamber 27 and the discharge passage 33. A circular ring portion 53 is formed in the partition member 51. The circular ring portion 53 extends from an outer peripheral edge portion of the partition member 51 toward the discharge passage 33. A separation space 54 is formed inside of the circular ring portion 53. The separation space 54 forms a part of the discharge passage 33. The circular ring portion 53 extends in the axial direction of the rotary shaft 17.

From an outer peripheral edge portion of the circular ring portion 53, a flange portion 56 extends radially outside. The flange portion 56 has an annular plate shape and is circular. The flange portion 56 is arranged on a side of the circular ring portion 53 opposite to the partition member 51. The flange portion 56 has an end surface 56a at a side opposite to the partition member 51 and has an end surface 56b at a side of the partition member 51. The oil separation member 50 is, with the end surface 56a of the flange portion 56 brought into contact with the bottom surface 40e of the narrow-width portion 40b, accommodated in the accommodation chamber 40 and press-fitted into the narrow-width portion 40b.

The circular ring portion 53 also has an end surface 53e at a side opposite to the partition member 51. A part of the end surface 56a of the flange portion 56 and a part of the end surface 53e of the circular ring portion 53 are opposed to a bottom surface of the ring-shaped groove portion 43. The end surface 56a of the flange portion 56 and the end surface 53e of the circular ring portion 53 and the ring-shaped groove portion 43 form the oil reservoir space 46. The oil reservoir space 46 is continuous from the refrigerant discharge space 45. The oil reservoir space 46 is arranged, in the rear housing member 15, outside of the refrigerant discharge space 45 in radial direction of the circular ring portion 53. The oil reservoir space 46 has a width H1 along an axial direction of the circular ring portion 53 that is smaller than a width H2 of the refrigerant discharge space 45 along the axial direction of the circular ring portion 53. The oil reservoir space 46 is connected to the displacement control valve 38 via a passage 48a.

A circular ring-shaped gap 47 is formed radially outside of the circular ring portion 53 in the accommodation chamber 40. Further, four introduction holes 57 are formed to communicate the gap 47 and the separation space 54, that is, the discharge chamber 27 and the discharge passage 33, with each other, in the circular ring portion 53.

The respective introduction holes 57 are formed as follows. First, a drill is inserted from radially outside of the flange portion 56 toward an outer peripheral surface of the circular ring portion 53. At this time, the drill is inserted in a direction perpendicular to the axial direction of the circular ring portion 53. The introduction hole 57 is thus formed in the circular ring portion 53. At this time, a part of the drill contacts the end surface 56b of the flange portion 56. At this time, by a part of the end surface 56b of the flange portion 56 being bored, a guide groove 58 is formed in the end surface 56b of the flange portion 56. The guide groove 58 is continuous from an opening of the introduction hole 57 facing the gap 47.

Also, a part of the drill contacts an end surface 51a of the partition member 51 facing the separation space 54 after penetrating through the circular ring portion 53. At this time, by a part of the end surface 51a of the partition member 51 being bored, a groove 59 is formed in the end surface 51a of the partition member 51. The groove 59 is continuous from an opening of the introduction hole 57 facing the separation space 54. The respective introduction holes 57 extend in directions perpendicular to the axial direction of the circular ring portion 53. Accordingly, the openings of the respective introduction holes 57 facing the separation space 54 are perpendicular to the axial direction of the circular ring portion 53.

Figure 3:
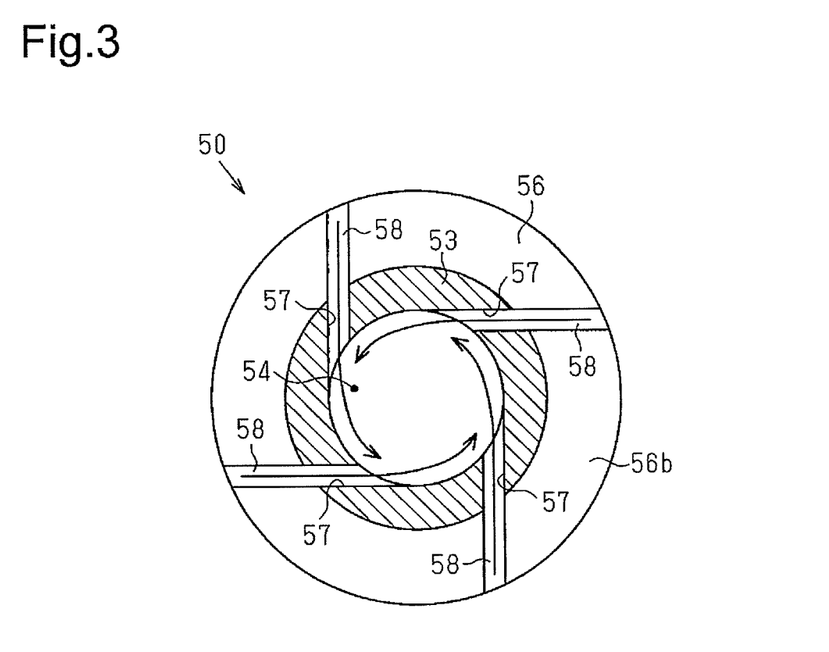
FIG. 3 is a sectional view taken along a line 3-3 of FIG. 2.

As shown in FIG. 3, the respective introduction holes 57 linearly penetrate through the circular ring portion 53. The respective introduction holes 57 extend in tangential directions to the circular ring portion 53. Accordingly, the openings of the respective introduction holes 57 facing the separation space 54 are oriented in tangential directions with respect to an inner peripheral surface of the circular ring portion 53. The respective introduction holes 57 are arranged at predetermined intervals in a circumferential direction of the circular ring portion 53. The opening of each introduction hole 57 is oriented in a direction substantially perpendicular to its neighboring introduction holes 57.

As shown in FIG. 2, a throttle member 60 having a throttle 60a is arranged in the discharge passage 33. The throttle member 60 is press-fitted into the first recess portion 41. The throttle member 60 has a pair of reed valves 60v. The pair of reed valves 60v open and close to vary the throttle amount of the throttle 60a. The displacement control valve 38 operates according to a difference between a pressure on an upstream side and a pressure on a downstream side of the throttle 60a. The difference in pressure between the upstream side and the downstream side of the throttle 60a reflects a refrigerant flow rate in the external refrigerant circuit 35.

Next, actions of the swash plate type compressor 10 described above will be described with reference to FIG. 1 to FIG. 3.

As shown in FIG. 2, refrigerant is guided to the gap 47 by the partition member 51 and the circular ring portion 53 after being discharged to the discharge chamber 27 and is then introduced into the separation space 54 via the respective introduction holes 57. The refrigerant flows into the separation space 54 and then circles in the separation space 54. Oil contained in the refrigerant is thereby centrifugally separated to adhere to the inner peripheral surface of the circular ring portion 53. The oil that has adhered to the inner peripheral surface of the circular ring portion 53 moves along the circular ring portion 53 to be discharged to the oil reservoir space 46. On the other hand, the refrigerant from which oil has been separated is discharged to the refrigerant discharge space 45 from the separation space 54.

As shown in FIG. 3, the respective introduction holes 57 extend in tangential directions to the circular ring portion 53. Therefore, when refrigerant is introduced into the separation space 54 via the respective introduction holes 57, the refrigerant circles inside the circular ring portion 53. Also, the respective introduction holes 57 extend in directions perpendicular to the axial direction of the circular ring portion 53. Therefore, as compared with when the respective introduction holes 57 extend in directions to obliquely cross the axial direction of the circular ring portion 53, the number of circles of the refrigerant after being introduced into the separation space 54 increases, and the ability to separate oil from the refrigerant is improved.

As shown in FIG. 1 and FIG. 2, oil is reserved in the oil reservoir space 46 and then supplied to the crank chamber 16 via the passage 48a, the displacement control valve 38, and the supply passage 37. The oil lubricates respective sliding parts in the crank chamber 16. Accordingly, the oil reservoir space 46, the passage 48a, and the supply passage 37 forms an oil passage 48. The crank chamber 16 serves to an oil reservoir chamber into which oil separated by the oil separation member 50 is introduced. On the other hand, refrigerant from which oil has been separated by the oil separation member 50 is supplied to the external refrigerant circuit 35 via the discharge passage 33.

Thus, according to the above-described embodiment, the following effects can be obtained.

(1) The oil separation member 50 has the separation member 51 to partition between the discharge chamber 27 and the discharge passage 33. The circular ring portion 53 is formed in the partition member 51. The circular ring portion 53 extends toward the discharge passage 33. The introduction hole 57 is formed in the circular ring portion 53 to communicate the discharge chamber 27 and the discharge passage 33 with each other. The introduction hole 57 extends in the tangential direction to the circular ring portion 53. According to this arrangement, refrigerant circles inside of the circular ring portion 53 while being introduced into the discharge passage 33 via the introduction hole 57. Also, the oil separation member 50 is the separate member from the rear housing member 15 and has the circular ring portion 53 formed with the introduction hole 57. According to this arrangement, there is no need for forming an introduction passage in the housing as in the conventional technique. Accordingly, the ability to separate oil from the refrigerant is improved, without the swash plate type compressor 10 being limited in the degree of the freedom of design.

(2) The throttle member 60 having the throttle 60*a* is arranged in the discharge passage 33. The throttle member 60 has a pair of reed valves 60*v*. The pair of reed valves 60*v* open and close to vary the throttle amount of the throttle 60*a*. According to this arrangement, the flow of the refrigerant is straightened by the reed valves 60*v* while circling within the oil separation member 50 and then passing through the throttle 60*a*. Therefore, the refrigerant can be made to smoothly flow in the discharge passage 33.

(3) The oil reservoir space 46 has the width H1 along the axial direction of the circular ring portion 53 that is smaller than the width H2 of the refrigerant discharge space 45 along the axial direction of the circular ring portion 53. According to this arrangement, refrigerant becomes unlikely to flow into the oil reservoir space 46 after being discharged to the refrigerant discharge space 45. Therefore, oil reserved in the oil reservoir space 46 becomes unlikely to be caught up by the refrigerant discharged to the refrigerant discharge space 45. Accordingly, re-mixing of the oil and refrigerant can be suppressed.

(4) A plurality of introduction holes 57 are formed in the circular ring portion 53. According to this arrangement, because the plurality of introduction holes 57 have a large channel sectional area in total, each introduction hole 57 can be accordingly reduced in channel sectional area. For example, when the introduction hole 57 having the large channel sectional area is formed solely in the circular ring portion 53, refrigerant introduced into the separation space 54 is disturbed in streamline or the refrigerant is disturbed because of a large opening of the introduction hole 57 open to the separation space 54 and becomes unlikely to circle. In this regard, forming a plurality of introduction holes 57 in the circular ring portion 53 avoids the problems described above.

(5) The introduction hole 57 extends in the direction perpendicular to the axial direction of the circular ring portion 53. According to this arrangement, as compared with when the introduction hole 57 extends in a direction to diagonally cross the axial direction of the circular ring portion 53, the number of circles of the refrigerant after being introduced into the separation space 54 increases, and the separation performance to separate oil from the refrigerant is further improved.

(6) The guide groove 58 is formed in the end surface 56*b* of the flange portion 56. The guide groove 58 is continuous from the opening of the introduction hole 57 facing the gap 47. According to this arrangement, refrigerant is guided by the guide groove 58 while flowing toward the introduction hole 57 after flowing into the gap 47. The refrigerant can thus be made to smoothly flow.

(7) Consideration will be given to a case where an introduction hole 57 having the same size as that in the case described above is formed in the circular ring portion 53 using the drill. In this case, for preventing the drill from contacting both of the end surface 56*b* of the flange portion 56 and the end surface 51*a* of the partition member 51, it is necessary to provide the circular ring portion 53 with a large axial dimension. In this regard, in the present embodiment, when forming the introduction hole 57, a part of the drill contacts the end surface 56*b* of the flange portion 56 and a part of the drill penetrated through the circular ring portion 53 contacts a part of the end surface 51*a* of the partition member 51. According to this arrangement, the circular ring portion 53 can be minimized in the axial dimension, and the introduction hole 57 having a desired size can also be formed in the circular ring portion 53.

(8) The swash plate type compressor 10 has the suction chamber 26 and the discharge chamber 27 in the rear housing member 15. Therefore, in the case of an introduction passage as in the conventional technique, it is difficult to secure a space to form the introduction passage in the rear housing member 15. In this regard, according to the present embodiment, simply accommodating the oil separation member 50 in the accommodation chamber 40 improves the ability to separate oil from the refrigerant. It is therefore effective to use the oil separation member 50 in the swash plate type compressor 10 of the above-described conventional technique.

(9) An arrangement in which an internal passage is formed in a circulation shaft to penetrate in the axial direction of the circulation shaft and the internal passage is made to communicate with an external refrigerant circuit via a discharge passage is provided as a conventionally known oil separation structure. In this oil separation structure, oil is separated from the refrigerant by circular movement of refrigerant-containing oil around the shaft for circulation. Thereafter, the refrigerant from which oil has been separated passes through the internal passage of the shaft for circulation and is discharged to the external refrigerant circuit. In this case, the refrigerant from which oil has been separated flows, after circling around the circulation shaft, such that it turns back toward the internal passage. Therefore, the refrigerant is unlikely to smoothly flow. In this regard, according to the present embodiment, refrigerant that has circled inside of the circular ring portion 53 can flow to the discharge passage 33 without being turned back halfway. Therefore, the refrigerant smoothly flows, so that the swash plate type compressor 10 has a satisfactory operation efficiency.

The above-described embodiment can be modified as follows.

Figure 4:
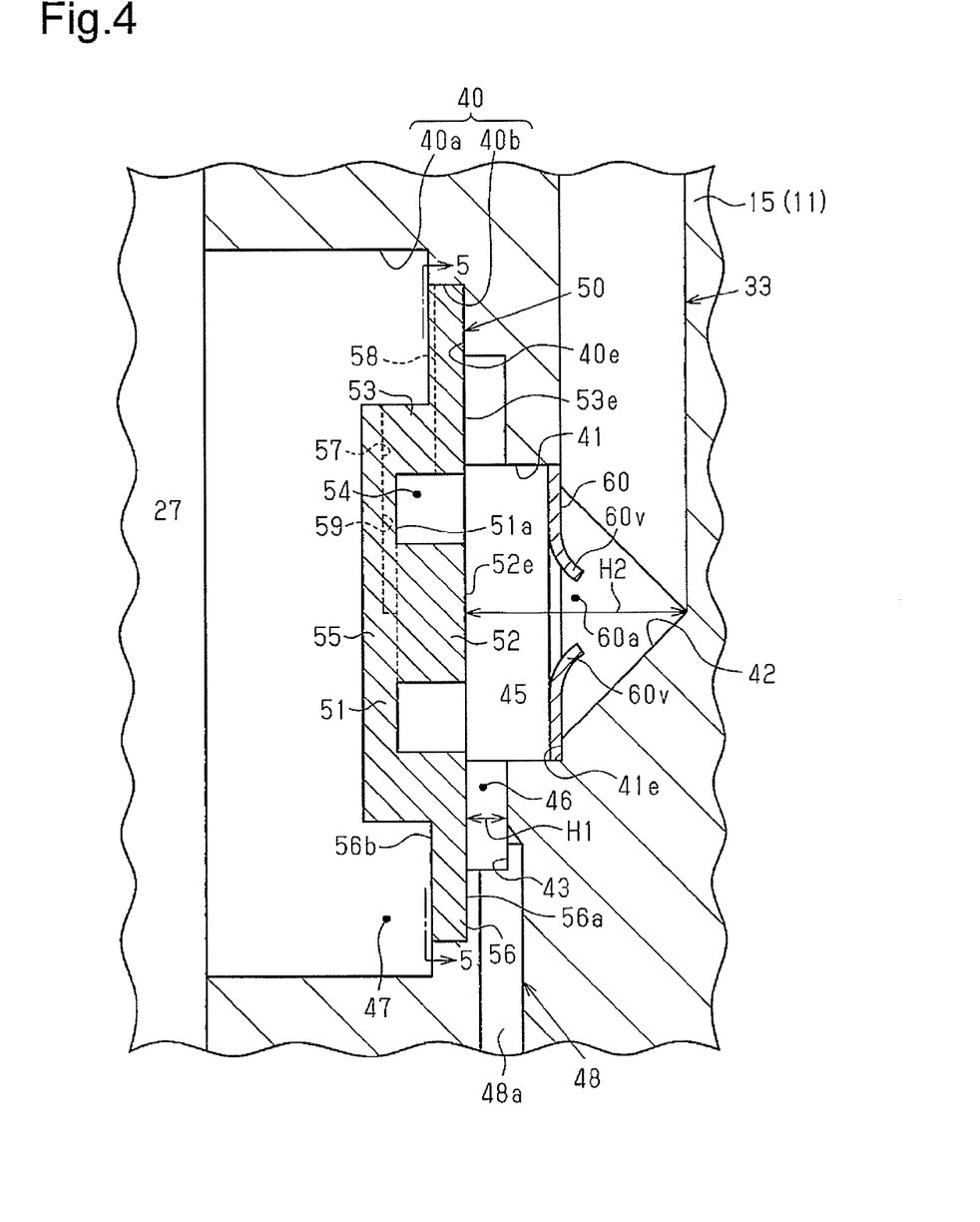
FIG. 4 is a side sectional view showing a part of a swash plate type compressor of another example in an enlarged manner.
Figure 5:
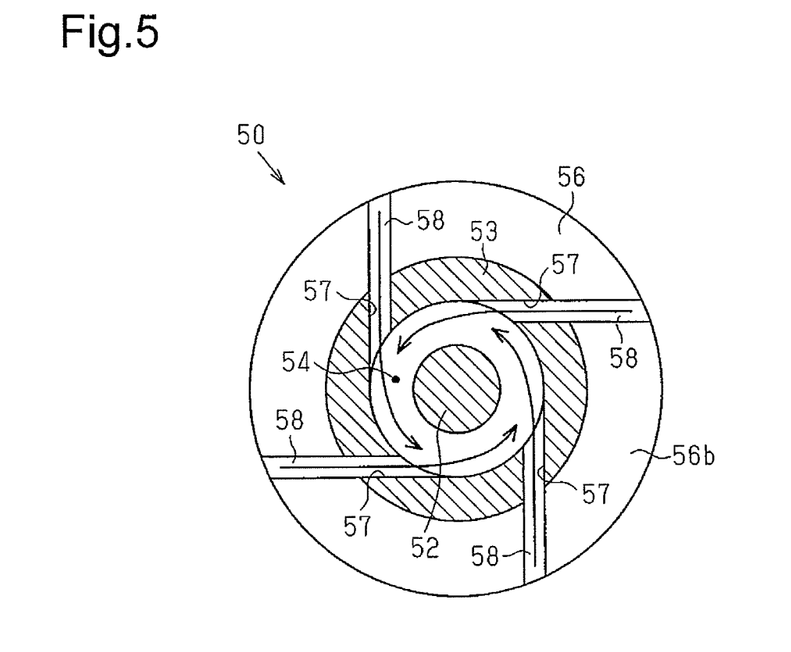
FIG. 5 is a sectional view taken along a line 5-5 of FIG. 4.

As shown in FIG. 4 and FIG. 5, the oil separation member 50 may include a columnar circulation shaft 52 in a part of the partition member 51 facing the discharge passage 33. The partition member 51 has a support portion 55 that supports the circulation shaft 52. The circular ring portion 53 projects or extends from an outer peripheral edge portion of the support portion 55 in a manner covering the circulation shaft 52 from radially outside. The circulation shaft 52 extends linearly in a direction perpendicular to the end surface 51*a* of the partition member 51. The circulation shaft 52 extends in the axial direction of the circular ring portion 53. The circulation shaft 52 is coincident in the axial direction with the rotary shaft 17. The circulation shaft 52 has an end surface 52e at a side opposite to the support portion 55. The end surface 56a of the flange portion 56 is arranged on the same plane as the end surface 53e of the circular ring portion 53 and the end surface 52e of the circulation shaft 52.

In this case, refrigerant circles around the circulation shaft 52 after being introduced into the discharge passage 33 via the introduction hole 57. Accordingly, the ability to separate oil from the refrigerant is further improved. Also, the end surface 52e of the circulation shaft 52 is arranged on the same plane as the end surface 53e of the circular ring portion 53. In this case, as compared with when the end surface 52e of the circulation shaft 52 projects further than the end surface 53e of the circular ring portion 53, the oil separation member 50 can have a small dimension along the axial direction of the circulation shaft 52. In contrast thereto, when the end surface 52e of the circulation shaft 52 projects further than the end surface 53e of the circular ring portion 53 to enter the refrigerant discharge space 45, the refrigerant discharge space 45 has a narrowed region, and refrigerant in the refrigerant discharge space 45 becomes likely to flow into the oil reservoir space 46. As a result, oil in the oil reservoir space 46 is caught up by the refrigerant. In this regard, according to the arrangement shown in FIG. 4 and FIG. 5, such a problem can be avoided.

Figure 6:
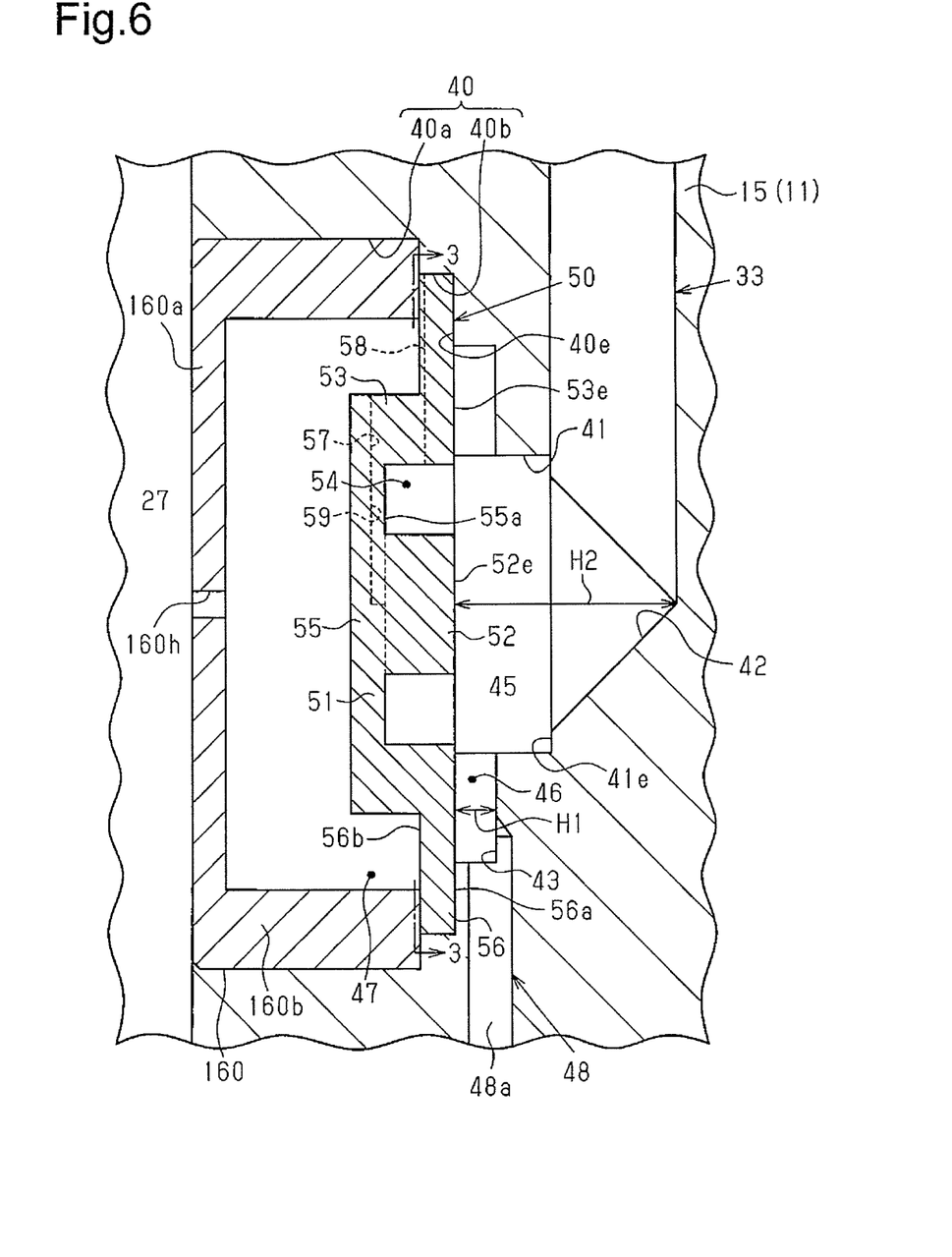
FIG. 6 is a side sectional view showing a part of a swash plate type compressor of still another example in an enlarged manner.

As shown in FIG. 6, a stopper member 160 may be mounted in the accommodation chamber 40 of the rear housing member 15. The stopper member 160 consists of a lid portion 160a and a cylindrical portion 160b extending axially from an outer peripheral edge portion of the lid portion 160a. The stopper member 160 is fixed to the rear housing member 15 by press-fitting the cylindrical portion 160b into an inner peripheral surface of the wide-width portion 40a of the accommodation chamber 40. A distal end of the cylindrical portion 160b is arranged within the gap 47 and is brought into contact with the end surface 56b of the flange portion 56. As a result of the flange portion 56 being sandwiched by the distal end of the cylindrical portion 160b and the bottom surface 40e of the narrow-width portion 40b due to the above-described arrangement, the oil separation member 50 is fixed in position.

The stopper member 160 has a through hole 160h at the center of the lid portion 160a. The through hole 160h functions as a fixed throttle. In this case, the displacement control valve 38 operates according to a difference between a pressure on an upstream side and a pressure on a downstream side of the through hole 160h. The difference in pressure between the upstream side and the downstream side of the through hole 160h reflects a refrigerant flow rate in the external refrigerant circuit 35.

The introduction hole 57 may extend in a direction to obliquely cross the axial direction of the circular ring portion 53.

The flange portion 56 may be eliminated from the oil separation member 50. In this case, the oil reservoir space 46 may be formed by a part of the end surface 53e of the circular ring portion 53 and the ring-shaped groove portion 43.

The oil reservoir space 46 may be formed without using the oil separation member 50. That is, a groove to form the oil reservoir space 46 may be formed in the rear housing member 15.

The width H1 of the oil reservoir space 46 along the axial direction of the circular ring portion 53 may be greater than the width H2 of the refrigerant discharge space 45 along the axial direction of the circular ring portion 53.

The width H1 of the oil reservoir space 46 along the axial direction of the circular ring portion 53 may be the same as the width H2 of the refrigerant discharge space 45 along the axial direction of the circular ring portion 53.

In the embodiment shown in FIG. 4 and FIG. 5, the end surface 52e of the circulation shaft 52 may be closer in position to the support portion 55 than the end surface 53e of the circular ring portion 53.

In the embodiment shown in FIG. 4 and FIG. 5, the end surface 52e of the circulation shaft 52 may be further separated in position from the support portion 55 than the end surface 53e of the circular ring portion 53.

The introduction holes 57 are not particularly limited in number.

The oil reservoir space 46 may be connected to the suction chamber 26 via a passage formed in the rear housing member 15. In this case, as a result of being supplied to the suction chamber 26 via the passage and being mixed with refrigerant introduced into the suction chamber 26 from the outlet of the evaporator 35c, oil in the oil reservoir space 46 lubricates respective sliding parts of the swash plate type compressor 10.

The throttle member 60 may not be provided for the discharge passage 33.

The oil separation member 50 may be arranged in a manner crossing the axial direction of the circular ring portion 53 and the axial direction of the rotary shaft 17 with each other.

The oil separation member 50 may have an elliptical shape in a plan view.

A throttle may be provided for the external refrigerant circuit 35. In this case, the displacement control valve 38 may be operated according to a difference between a pressure on an upstream side and a pressure on a downstream side of the throttle of the external refrigerant circuit 35.

The displacement control valve 38 may be a displacement control valve that operates upon sensing a suction pressure.

The swash plate type compressor 10 may be a fixed displacement compressor.

The swash plate type compressor 10 may be a double-headed piston type compressor.

The swash plate type compressor 10 may be used for an air conditioner other than vehicle air conditioners.

The compressor may be a scroll type, vane type, or Roots type compressor, besides a swash plate type compressor 10.

A chlorofluorocarbon may be used as the refrigerant, besides carbon dioxide.

The invention claimed is:

1. A compressor comprising:
   a discharge chamber that is formed in a housing;
   a discharge passage that is formed in the housing and discharges refrigerant from which oil has been separated by the oil separation member to an external refrigerant circuit; and
   an oil passage that is formed in the housing and introduces oil separated by the oil separation member into an oil reservoir chamber, wherein
   an oil separation member that is a separate member from the housing and separates oil from refrigerant discharged from the discharge chamber;
   the oil separation member has a partition member that partitions between the discharge chamber and the discharge passage,
   a circular ring portion is provided in a manner extending toward the discharge passage in the partition member,
   a separation space is formed inside of the circular ring portion, at least one introduction hole that communicates the discharge chamber and the discharge passage with each other is formed in the circular ring portion, the at least one introduction hole extends in a tangential direction to the separation space formed in the circular ring portion, a flange portion extending radially outside the circular ring portion from an outer peripheral edge portion of the circular ring portion, wherein the flange portion has an annular shape and is circular, and wherein the flange portion is arranged on a side of the circular ring portion opposite to the partition member;

a guide groove formed in an end surface of the flange portion, wherein the guide groove is continuous with the at least one introduction hole; and a groove formed in an end surface of the partition member facing the discharge passage, wherein the groove is continuous with the at least one introduction hole, wherein a refrigerant, which has been discharged to the discharge chamber, is introduced into the separation space via the at least one introduction hole and then circles in the separation space.

2. The compressor according to claim 1, wherein the oil separation member includes a columnar circulation shaft in a part of the partition member facing the discharge passage.

3. The compressor according to claim 2, wherein the partition member has a support portion that supports the circulation shaft, the circular ring portion extends from an outer peripheral edge portion of the support portion, and the circulation shaft and the circular ring portion respectively have end surfaces at a side opposite to the support portion, and the end surface of the circulation shaft is arranged on a plane the same as the end surface of the circular ring portion or is closer to the support portion than the end surface of the circular ring portion.

4. The compressor according to claim 1, wherein in the discharge passage, a throttle member having a reed valve is provided, and the reed valve opens and closes to vary the throttle member in throttle amount.

5. The compressor according to claim 1, wherein the discharge passage includes a refrigerant discharge space to which refrigerant, from which oil has been separated, is discharged from the oil separation member, the oil passage includes an oil reservoir space in which oil separated from refrigerant by the oil separation member is reserved, the reservoir space is arranged, in the housing, radially outside of the circular ring portion further than the refrigerant discharge space, the oil reservoir space has a width along an axial direction of the circular ring portion that is smaller than a width of the refrigerant discharge space along the axial direction of the circular ring portion.

6. The compressor according to claim 1, wherein the at least one introduction hole in the circular ring portion comprises a plurality of introduction holes.

7. The compressor according to claim 1, wherein the at least one introduction hole extends in a direction perpendicular to an axial direction of the circular ring portion.

* * * * *